(12) United States Patent
Carpenter et al.

(10) Patent No.: US 7,454,117 B2
(45) Date of Patent: Nov. 18, 2008

(54) FIBER SPLICING AND GRIPPING DEVICE

(75) Inventors: James B. Carpenter, Austin, TX (US); Akihiko Yazaki, Hachiouji (JP); Takaya Yamauchi, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 58 days.

(21) Appl. No.: 11/852,803

(22) Filed: Sep. 10, 2007

(65) Prior Publication Data

US 2007/0297746 A1    Dec. 27, 2007

Related U.S. Application Data

(63) Continuation of application No. 10/873,879, filed on Jun. 22, 2004, now abandoned.

(51) Int. Cl.
*G02B 6/00* (2006.01)
(52) U.S. Cl. ............... 385/137; 385/134; 385/135; 385/136
(58) Field of Classification Search ............ None
See application file for complete search history.

(56) References Cited

U.S. PATENT DOCUMENTS

| | | |
|---|---|---|
| 4,755,018 A | 7/1988 | Heng et al. |
| 4,818,055 A | 4/1989 | Patterson |
| 4,824,197 A | 4/1989 | Patterson |
| 5,102,212 A | 4/1992 | Patterson |
| 5,138,681 A | 8/1992 | Larson et al. |
| 5,155,787 A | 10/1992 | Carpenter et al. |
| 5,159,653 A | 10/1992 | Carpenter et al. |
| 5,337,390 A | 8/1994 | Henson et al. |
| RE36,146 E | 3/1999 | Novack et al. |
| 2005/0063645 A1 | 3/2005 | Carpenter et al. |
| 2005/0063662 A1 | 3/2005 | Carpenter |

FOREIGN PATENT DOCUMENTS

| | | |
|---|---|---|
| EP | 0 290 188 A2 | 11/1988 |
| EP | 0 810 455 A1 | 12/1997 |

*Primary Examiner*—Frank G Font
*Assistant Examiner*—Erin D Chiem
(74) *Attorney, Agent, or Firm*—Gregg H. Rosenblatt

(57) ABSTRACT

An optical fiber splicing and gripping device includes a material having first and second members hingedly attached. A gripping region is formed in the material that includes first and second gripping portions disposed on first and second inner portions of each of the members. The material further includes separate first and second clamping zones along a length of the gripping region. The optical fiber splicing and gripping device further includes a cap engageable with the material to selectively actuate the first clamping zone independently of actuating the second clamping zone.

20 Claims, 7 Drawing Sheets

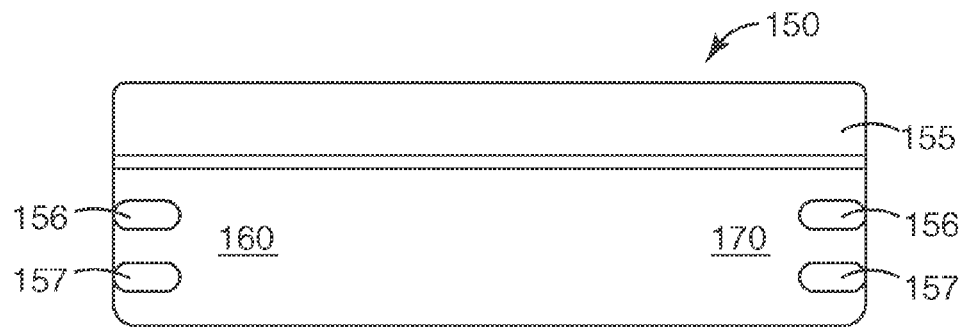
Fig. 3A
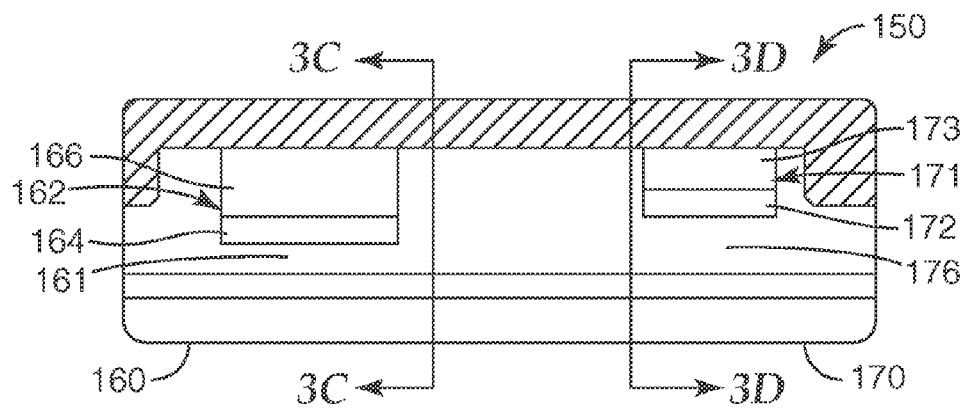
Fig. 3B
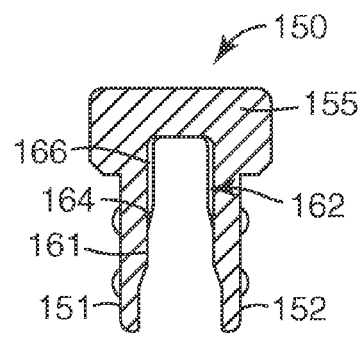 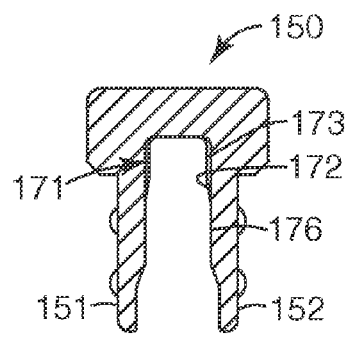
Fig. 3C    Fig. 3D

FIBER SPLICING AND GRIPPING DEVICE

CROSS REFERENCE TO RELATED APPLICATION

This application is a continuation of U.S. application Ser. No. 10/873,879, filed Jun. 22, 2004, now abandoned, the disclosure of which is incorporated by reference in its entirety herein.

BACKGROUND OF THE INVENTION

1. Field of the Invention

The present invention is directed to a fiber splicing and gripping device.

2. Related Art

Mechanical devices for splicing optical fibers for the telecommunications industry are known. For example, U.S. Pat. No. 5,159,653 describes an optical fiber splice that includes a sheet of ductile material having a focus hinge that couples two legs, where each of the legs includes a v-type groove to optimize clamping forces for conventional glass optical fibers. The described splice device has been commercially incorporated in the FIBRLOK II™ mechanical fiber optic splice device, available from 3M Company, of Saint Paul, Minn. In addition, U.S. Pat. No. 5,337,390 describes an adhesiveless connector, with a connector body and ferrule attached to one another, with a mechanical gripping element residing in the connector body to hold an optical fiber in place. The gripping element described therein is engageable by moving a plug in a direction transverse to bores formed in the connector body and ferrule. The described connector has been commercially incorporated in the CRIMPLOK™ fiber optic connector, available from 3M Company, of Saint Paul, Minn. Conventional devices are also described in U.S. Pat. Nos. 4,824,197; 5,102,212; 5,138,681; and 5,155,787. A device for gripping optical fibers is described in U.S. Publication No. 2005-0063645-A1, incorporated by reference in its entirety.

SUMMARY OF THE INVENTION

According to a first aspect of the present invention, an optical fiber splicing and gripping device includes a material having first and second members hingedly attached. A gripping region is formed in the material that includes first and second gripping portions disposed on first and second inner portions of each of the members. The material further includes separate first and second clamping zones along a length of the gripping region. The optical fiber splicing and gripping device further includes a cap engageable with the material to selectively actuate the first clamping zone independently of actuating the second clamping zone.

According to another embodiment, an actuating cap for engageably mating an optical fiber splicing and gripping device includes a main body portion that extends along a length of the cap. A first cap member and a second cap member are coupled by and extend from the main body. The cap further includes a first cam and a second cam, where the first cam and the second cam are disposed on an inner surface of at least one of the first and second members.

According to yet another embodiment of the present invention, an optical connector includes a base that houses the optical fiber splicing and gripping device described above.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The present invention will be further described with reference to the accompanying drawings, wherein:

FIGS. 3A-3D show various cross-sectional views of an exemplary actuating cap according to an embodiment of the present invention;

Figure 1A:
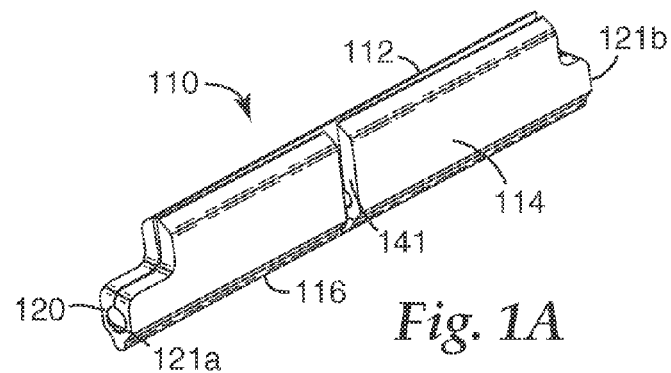
FIG. 1A shows a perspective view of a fiber splicing and gripping element according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

The figures show various embodiments of an optical fiber splicing and gripping device. The terms "gripping", "splicing", "clamping" or "connecting" may be applied to devices shown, and are not intended to be mutually exclusive, as the devices and methods of the present invention can be utilized for fiber gripping, fiber clamping, fiber splicing, and/or fiber connecting applications. The term "splice" should not be construed in a limiting sense since the elements shown in the various embodiments can indeed allow removal of a fiber.

Figure 1B:
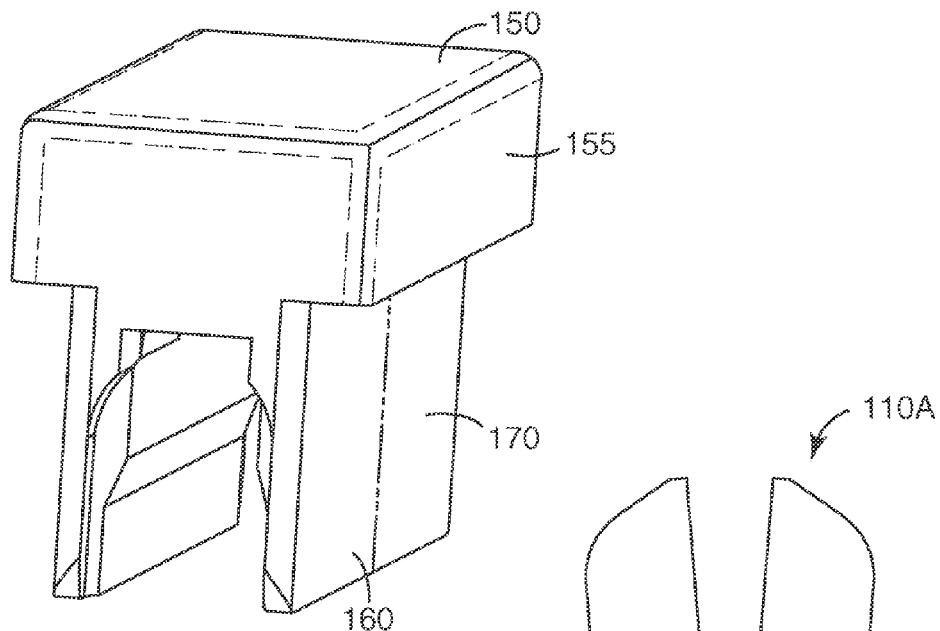
FIG. 1B shows a perspective view of an exemplary actuating cap according to an embodiment of the present invention.

FIGS. 1A and 1B show two components of a fiber splicing and gripping device according to a first embodiment of the present invention, a splice element 110 (FIG. 1A) and an actuating cap 150 (FIG. 1B). In FIG. 1A, element 110 is shown in a folded state. In this exemplary folded state, element 110 provides for the initial alignment of the fiber(s)

being spliced. Element 110 includes a first member 112 and a second member 114 formed from, e.g., a sheet of material 111 (see FIG. 2A), hingedly attached at a first end of each of the members, here shown as hinge region 116. Element 110 further includes separate splicing and/or clamping zones. In one exemplary embodiment, one or more slots, such as slot 141, can be provided to define the separate splicing/clamping zones. Alternatively, the separate splicing/clamping zones can be defined by the thinning of the sheet 111 material thickness between the splicing/clamping zones. A gripping region 120 is also provided and includes first gripping portion 122 and second gripping portion 124 disposed on first and second inner portions of each of the members, (see e.g., FIG. 2D). Gripping region 120 is adapted to receive an optical fiber in its gripping portions. Optical fibers can be inserted into element 110 through ports 121*a* and 121*b*. In an exemplary embodiment of the present invention, gripping device 110, when placed in a closed (actuated or engaged) state, can apply a substantial force to an outer perimeter of the optical fiber(s) disposed in the gripping region.

The dimensions of sheet 111 (see e.g., FIGS. 2A-2C) may vary considerably depending upon the application. Gripping device 110 can be formed from a sheet 111 of deformable material, preferably a ductile metal such as aluminum. An exemplary material is an aluminum alloy conventionally known as "3003", having a temper of 0 and a hardness on the Brinnell scale (BHN) of between 23 and 32. Another acceptable alloy is referred to as "1100", and has a temper of 0, H14 or H15. Acceptable tensile strengths vary from 35 to 115 megapascals. Other metals and alloys, or laminates thereof, may be used in the construction of sheet 111. Such metals include copper, tin, zinc, lead, indium, gold and alloys thereof. In addition, a polymeric material, clear or opaque, may be used for sheet 111. Suitable polymers include polyethylene terephthalate, polyethylene terephthalate glycol, acetate, polycarbonate, polyethersulfone, polyetheretherketone, polyetherimide, polyvinylidene fluoride, polysulfone, and copolyesters such as VIVAK (a trademark of Sheffield Plastics, Inc., of Sheffield, Mass.).

Figure 2D:
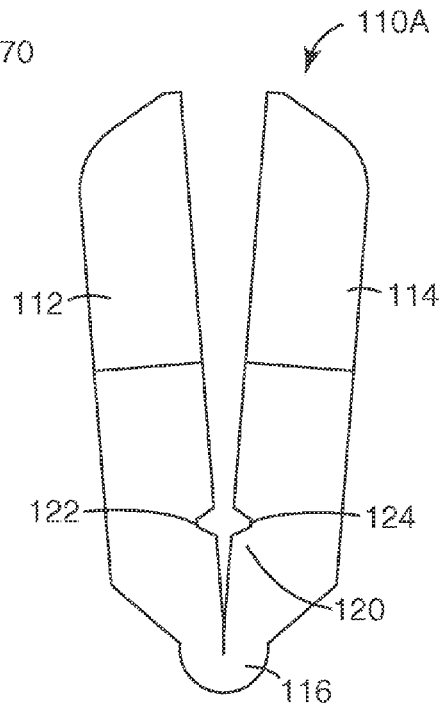
FIG. 2D shows a side view of a folded fiber splicing and gripping element according to an embodiment of the present invention.

With reference to FIGS. 1A and 2D, a hinge region 116 can be formed on an outside surface of sheet 111, extending generally the length of sheet 111. Hinge region 116 can comprise a centrally located groove that can be formed of an area of reduced thickness that defines a hinge that separates sheet 111 into two identical plate-like members or legs 112 and 114. Such a hinge can be formed in the manner described in U.S. Pat. No. 5,159,653, incorporated by reference herein in its entirety. In its folded state, the embodiment of element 110 is configured to be insertable in an optical fiber splice, such as a FIBRLOK II™ mechanical fiber optic splice device. Element 110 can also be implemented in other fiber optic splices and optical connectors, as would be apparent to one of ordinary skill in the art given the present description.

FIG. 1B shows a front perspective view of an exemplary cap 150. The cap 150 is designed to engage element 110 to place element 110 into a closed or actuated state. According to exemplary embodiments of the present invention, as element 110 includes separate clamping zones, cap 150 is designed to include separate actuating mechanisms, such as region 160 and region 170 that are coupled to main body portion 155. As cap 150 engages with element 110, the different clamping zones can be actuated/closed at different times. A more detailed description of the structure of an exemplary cap is provided below.

Figure 2A:
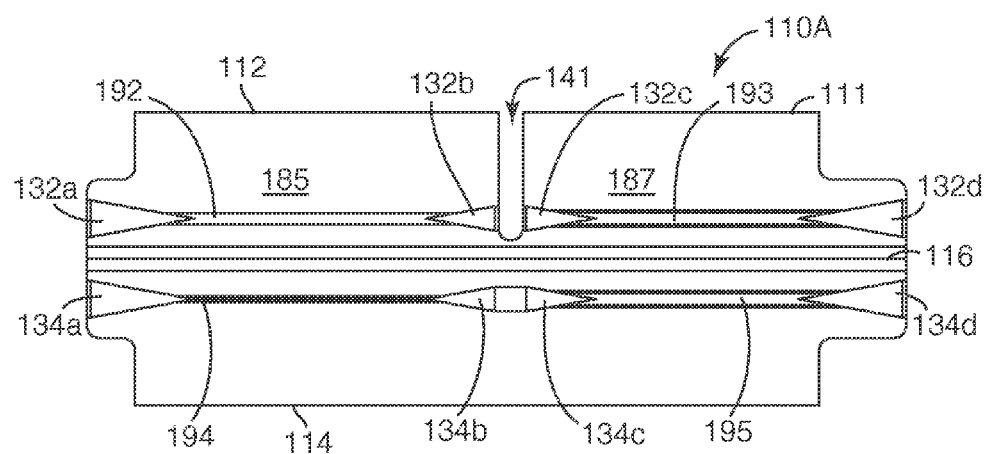
FIG. 2A shows a top view of an unfolded fiber splicing and gripping element according to an embodiment of the present invention.

FIG. 2A shows an exemplary element 110A in a top plan view in an unfolded state. Element 110A includes a slot 141 that defines separate splicing/clamping zones 185 and 187. Slot 141 can be cut into sheet 111 from one side to near the center of the element, where hinge region 116 can be located. Element 110A includes a sheet of material 111 having members 112 and 114 hingedly attached via hinge region 116 such as described above. Member 112 includes gripping portions or grooves 192 and 193 that can be shaped as v-grooves or can comprise some other polygonal shape, depending on the fiber type(s) to be gripped and/or spliced. Grooves 192 and 193 can be formed to have the same groove shape, or different groove shapes, depending on the application. Alternatively, grooves 192 and 193 can be pre-grooved as is described in U.S. Publication No. 2005-0063645-A1, incorporated by reference above. Member 114 includes gripping portions 194 and 195 (located opposite gripping portions 192 and 193, respectively) that can be pre-grooved, configured as v-grooves, or configured as some other polygonal shape. Grooves 194 and 195 can be formed to have the same groove shape, or different groove shapes, depending on the application. For example, as shown in FIG. 2D, an end view of element 110A in a folded, fiber receiving (open) state, first gripping portion 122 and second gripping portion 124 can be configured to include v-grooves.

Figure 2B:
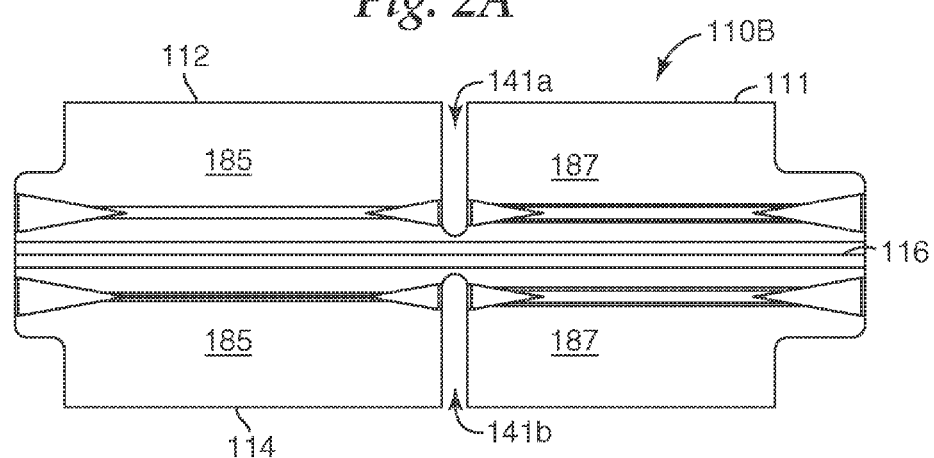
FIG. 2B shows a top view of an unfolded fiber splicing and gripping element according to an alternative embodiment of the present invention.
Figure 2C:
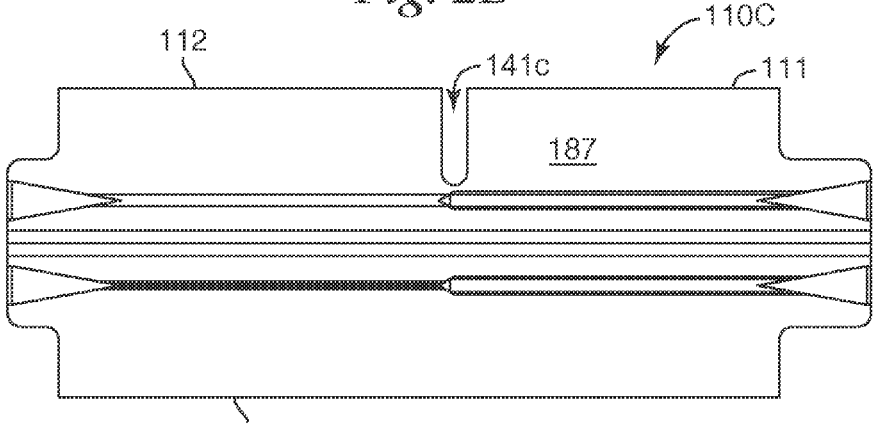
FIG. 2C shows a top view of an unfolded fiber splicing and gripping element according to another alternative embodiment of the present invention.

In an alternative embodiment of an element 110C, shown in FIG. 2C, slot 141*c* can be partially cut into sheet 111 from one side so as not to cut through the groove portion of the gripping region.

Element 110A can be utilized to splice optical fibers of any type, such as conventional glass-glass-polymer ("GGP") fiber (described in U.S. Pat. No. Re. 36,146) conventional glass-based fibers, POF (Plastic Optical Fiber), and TECS (Technically Enhanced Clad Silica) fiber. These fibers may be single mode or multimode fibers and may have a standard diameter (including buffer coatings) such as about 125 μm (with or without a buffer coating being removed), 250 μm outer diameter, and/or 900 μm outer diameter, as well as nonstandard diameters that can be smaller than 125 μm, between 125 μm and 900 μm, and/or larger than 900 μm, or others. In one exemplary alternative embodiment, grooves 192 and 194 are configured to form a first diameter (or groove size) when the device is actuated, and grooves 193 and 195 are pre-grooved to form a second diameter (or groove size) when the device is actuated. The second diameter (or groove size) can be the same as or different than the first diameter (or groove size). In one exemplary embodiment, for example, when splicing silica-clad fibers, groove 192 can have a v-groove shape, and groove 194 can be omitted, whereas grooves 193 and 195 can be configured to clamp a buffered fiber of greater diameter. In addition, one or more of the gripping regions of members 112 and 114 can optionally further include one or more of cones or recesses 132*a*-132*d* and 134*a*-134*d* to form lead-in fiber-receiving regions.

As shown in FIG. 2A, element 110A includes a single slot structure, e.g., slot 141, which can be cut through member 112 or member 114 (in this figure, slot 141 is cut through member 112). The slot or slots can be used to define different clamping zones (when element 110A is placed in a folded state), where zone 185 can provide a splicing zone and zone 187 can provide a buffer clamping zone, or vice versa. Thus, splicing zone 185 can be closed or opened independently of the buffer clamping zone 187, or vice versa, and at a different time in the termination sequence. For example, when splicing a fiber stub to a terminating fiber, the fiber splice can be located in zone 185 (also referred to as a splicing region) and the buffer-coated terminating fiber can be held in place by clamping zone 187. For example, buffer clamp grooves 193 and 195 can be designed to clamp onto a 250 μm buffer coated optical fiber (when in a closed or actuated state). This clamping can provide retention of the fiber when the element is fully closed.

In an alternative embodiment, shown in FIG. 2B, element 110B includes a double slot structure (including slots 141a and 141b formed in sheet 111 opposite the hinge 116 from each other) to form zones 185 and 187. Further multiple slot arrangements can offer differing strengths, depending on the application. Of course, as will be apparent to one of ordinary skill in the art given the present description, different numbers of slots may also be utilized without departing from the scope of the invention.

In a further alternative embodiment, zones 185 and 187 can be defined by the thinning of the sheet material thickness 111 separating the splicing and/or clamping zones. For example, separation of the splicing and or clamping zones can be achieved by reducing the thickness of the sheet material by 50% to 90% of its original thickness, in the region between the zones, depending on the type of sheet material being used.

These exemplary configurations allow different levels of stress to be imparted on the fiber that is located in each zone. In one exemplary connector embodiment, a short length of optical fiber that is fixed on one end, being adhered into a ferrule, and extending out of the ferrule into the center of the splicing zone, (referred to herein as a "fiber stub"), can be spliced to a terminating fiber, whereby the splicing zone can be actuated (closed) first, followed by actuating the clamping (or gripping) zone that secures the terminating fiber in place. This splicing sequence can ensure sufficient optical contact between the fiber ends. Alternatively, a light stress can be utilized for the precise alignment of two fibers in the splicing zone, while an increased stress can be imparted onto the fiber in the clamping zone to increase overall fiber retention. After actuation of the clamping zone, the splice can be completed by fully actuating the splicing zone. It is noted that the term "closed" or "actuated" is intended to mean when the gripping portions of the element exert a substantial force on an outer portion of the fiber being spliced/gripped/retained. Thus, at least some retention force can be placed on a fiber or buffer without fully actuating the device.

Thus, according to exemplary embodiments of the present invention, full actuation of one clamping zone can be accomplished independently of (e.g., prior to, at the same time as, or after) actuation of another clamping zone using the mechanisms described herein.

As mentioned previously, according to exemplary embodiments of the present invention, a cap 150 (also referred to herein as an actuating cap) can be used to actuate element 110, 110A, 110B, 110C. Cap 150 can be constructed of rigid materials, such as metals or plastics. For example, cap 150 can be formed as a plastic injection molded component. Other suitable materials would be apparent to those of ordinary skill in the art given the present description.

FIGS. 3A-3D show various views of an exemplary cap 150. In FIG. 3A, a cross sectional side view of an outer surface, cap 150 includes a main body portion 155 that extends along the length of the cap and couples first clamping mechanism 160 and second clamping mechanism 170. In the exemplary configuration shown in FIG. 3A, cap 150 can optionally further include one or more detents, such as detents 156 and 157, disposed on an outer surface of either or both of first clamping mechanism 160 and second clamping mechanism 170. The detent(s) can be utilized for positioning and engagement of the cap with a connector or splice body (shown in more detail in FIGS. 5A-5C). Optionally, more than two detents can also be provided on the cap 150.

FIG. 3B shows a cross section side view of an interior portion of cap 150, which includes interior cam 162 and interior cam 171. Cam 162 is disposed on an inner surface of clamping mechanism 160 and cam 171 is disposed on an inner surface of clamping mechanism 170. Cam 162 includes a first cam region 161. During closure of the splicing and gripping device, the legs of the splicing and gripping element can rest on region 161, wherein the legs still remain in an open position (i.e., the element legs are not urged toward each other thus allowing for fiber entry). Cam 162 further includes a first cam transition area 164 and a second cam transition area 166. Cam 171 includes a first cam region 176, a first cam transition area 172 and a second cam transition area 173. Using the cross sectional end views of exemplary cap 150 in FIGS. 3C and 3D as a reference, cam transition portion 164 can be designed to gradually actuate the closure of the splicing zone of element 110, 110A, 110B, 110C prior to the actuation of the buffer clamping. In this example, cam transition portion 164 is located at a lower position (with respect to main body portion 155) on cap members (or legs) 151 and 152 than is cam transition portion 172. In addition, gradual clamping of an element zone (e.g., zone 185) can be accomplished by sloping the protrusion of cam transition area 164. Also, cam transition area 172 does not engage element 110, 110A, 110B, 110C until cam transition portion 166 has engaged the splice element. Thus, as cap 150 engages element 110, 110A, 110B, 110C, cams 162 and 171 can slide over element legs 112 and 114, urging them toward one another. In an exemplary embodiment, rounded edges along the outside surface of element legs 112 and 114 (see e.g., FIG. 2C) can further facilitate a camming action.

According to an alternative embodiment of the present invention, cap 150 can further include additional cam transition portions for one or both of cams 162 and 171.

Figure 4A:
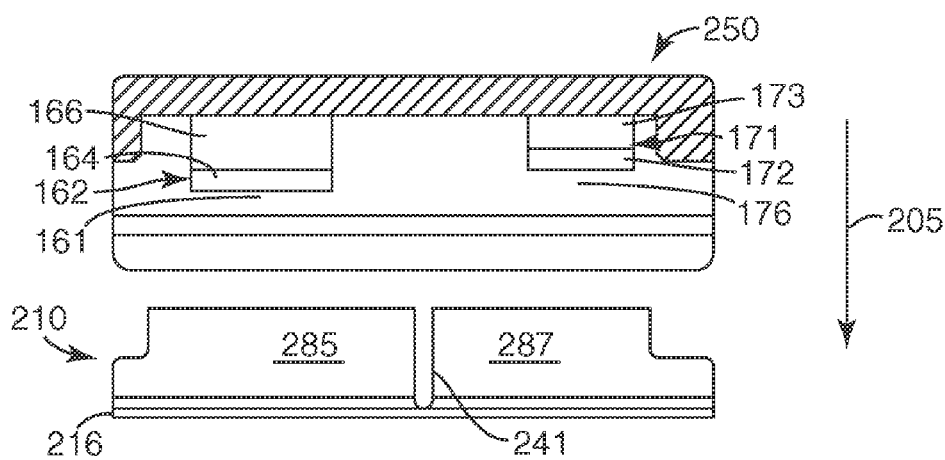
FIGS. 4A-4D show a schematic actuation sequence of an exemplary fiber splicing and gripping device.

FIGS. 4A-4D show an example actuation sequence of a splice element 210 by cap 250. In this example, it is assumed that a fiber stub and a terminating fiber (not shown) are inserted in the gripping portion of splice zone 285 and the buffer portion of the terminating fiber has been received in the gripping portion of clamping zone 287. In FIG. 4A, an unassembled view, cap 250 is not in contact with element 210. As shown in the cross sectional side view of FIG. 4A, a single (or double) slot 241 is shown that defines zones 285 and 287 of element 210.

Figure 4B:
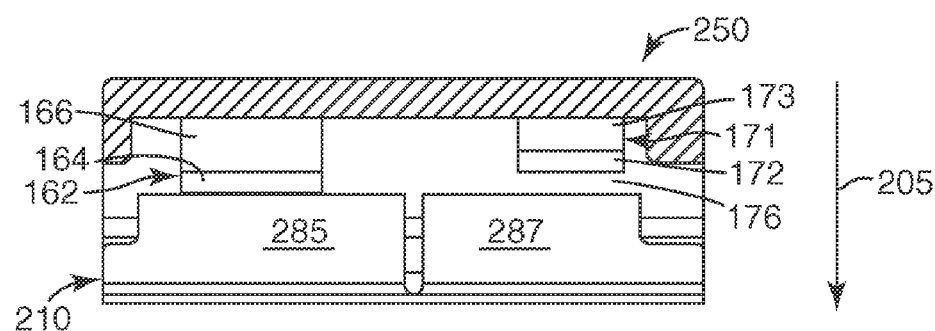

FIG. 4B shows that cap 250 has been moved toward element 210 in the direction of arrow 205 and is in contact with first cam regions 161 and 176 so that preliminary optical contact of the ends of the fiber stub and the terminating fiber can be made in splicing zone 285. In FIG. 4B, the beginning of cam transition area 164 is coincident with the top portion of splice zone 285.

Figure 5A:
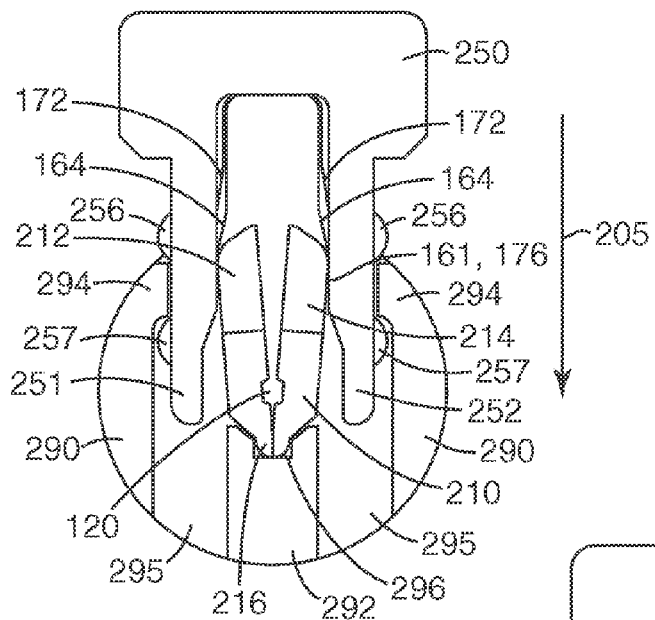
FIGS. 5A-5C show another a schematic actuation sequence of an exemplary fiber splicing and gripping device.
Figure 5B:
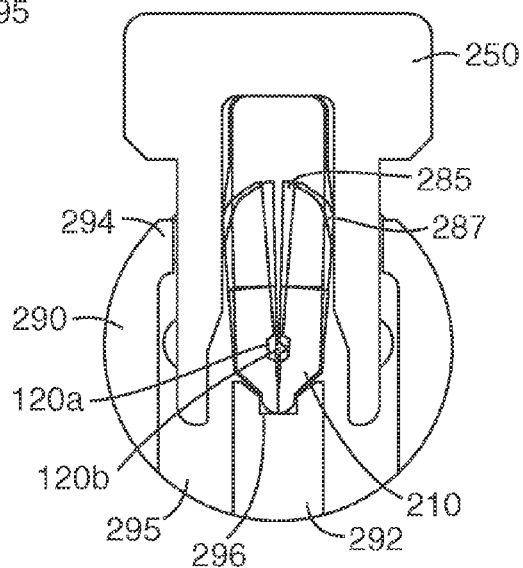
Figure 5C:
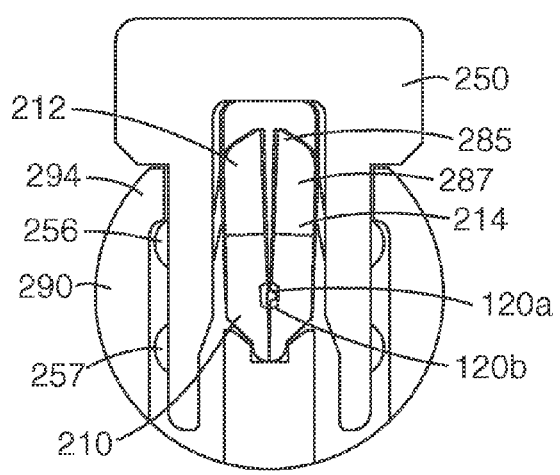

The closing movement can be accomplished by hand, and preferably with the use of a tool. For example, an exemplary tool would receive the main body of the fiber alignment and gripping device, (splice or connector), into a locating nest that is part of the tool base. The tool base can be designed for placement onto a flat surface, and/or held in an operator's hand. The fiber alignment and gripping device would be placed into the nest such that the actuation cap is in an upward position (e.g., as is illustrated in FIGS. 5A-5C). This tool can also include a lever arm attached to the base which pivots at the attachment point, and extends from the attachment point to its end which extends beyond the locating nest. The end of the lever arm would be designed to allow a thumb or finger to rest on it, and have force applied to it, in order to drive it toward the tool base. At a point between the lever arm attachment point on the base, and the end of the lever arm, a third point, which can be about the size of the actuation cap, can be located directly in line with the device locating nest. This third point, or actuation point, comes into contact with the top of the actuation cap as the lever arm is rotated toward the tool base. When force is applied to this lever arm, the cap is driven into the device in the same direction as arrow 205. This lever arm may also include a stop so the actuation cap is not over actuated. Upon actuation, the lever arm is rotated out of the way and the device is removed from the tool.

Figure 4C:
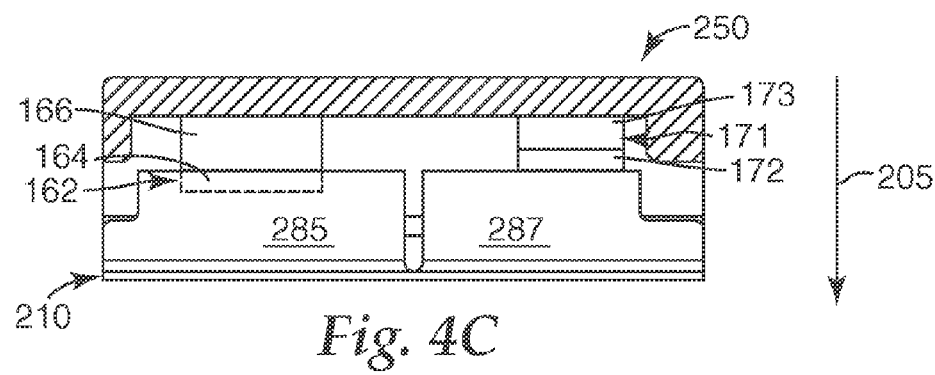
Figure 4D:
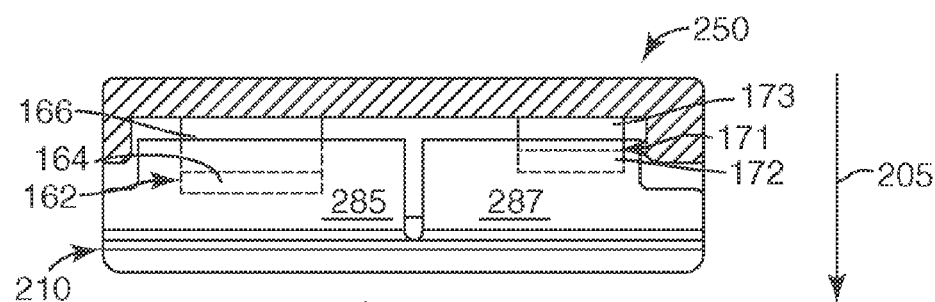

As cap 250 is continually moved in the direction of arrow 205, e.g., by the lever arm of the tool, FIG. 4C shows that transition cam area 164 has fully engaged zone 285 prior to the engagement of zone 287, which is not yet acted on by cam transition portion 172. By this action, the splicing of the fiber stub to the terminating fiber has been completed. FIG. 4D shows full actuation of element 210, where zone 285 has been closed by cam 162 and zone 287 has been closed by cam 171. Thus, as zone 287 has been fully actuated, the terminating fiber has been securely gripped within element 210, thus providing better retention of the splice.

Another illustration of the actuation of element 210 is shown in cross sectional views in FIGS. 5A-5C, where element 210 is disposed in a base 290, which can be part of an optical connector or a stand-alone splice device. In this example, it is again assumed that a fiber stub and a terminating fiber (not shown) are inserted in the gripping portion of splice zone 285 and the buffer portion of the terminating fiber has been received in the gripping portion of clamping zone 287. In FIG. 5A, element 210 is disposed on a pedestal portion 292 of base 290. In this exemplary embodiment, the pedestal portion 292 can further include a depression 296 that receives and supports the hinge portion 216 of element 210. Base 290 further includes slots 295, to receive cap members 251 and 252, and base catches 294, to catch (or lock in place) cap detents 256 and 257. The construction of element 210 and cap 250 is similar to that described above.

In FIG. 5A, cap 250 is moved in the direction of arrow 205 to a position where detents 257 are secured by base catches 294. In the exemplary embodiment, this position also corresponds to the beginning of the engagement of members (or legs) 212 and 214 of zone 285 by transition cam area 164. From this point, as shown in FIG. 5B, with further movement of cap 250 in the direction of arrow 205, zone 285 (here, configured as a splicing zone) becomes actuated (closed) as the members 212 and 214 of zone 285 are forced towards each other by cam transition area 164, while zone 287 (here configured as a buffer clamping zone) remains in a folded, open state. In this exemplary embodiment, zone 285 further includes a gripping region 120b that includes a v-groove configuration to accomplish splicing of the fiber stub to the terminating fiber. In addition, zone 287 includes a gripping region 120a that is configured to grip or clamp the buffer portion of the terminating fiber.

With continued movement of the cap 250 in the direction of arrow 205 (toward element 210), FIG. 5C illustrates a fully actuated position of both zone 285 and zone 287. In this exemplary embodiment, full actuation coincides with detents 256 being secured by base catches 294 of the base 290. At this point the cap is locked in placed on base 290, but can be removed with a pulling force in a direction opposite to that of arrow 205. In an alternative embodiment, the distance between cap detents 256 and 257 can be altered to allow more or less distance to actuate the element for slower or faster actuation. Thus, according to an exemplary embodiment, the fiber splicing and gripping device can provide independent gripping/splicing to different portions of the fiber(s) being spliced/gripped.

As would be apparent to one of ordinary skill in the art given the present description, the sequential and/or gradual clamping of different zone element clamping/splicing zones can be accomplished using different structures. For example, the actuation cap can have a single cam structure and element members 212 and 214 of zone 287 can have shorter lengths (extending from the hinge region) than members 212 and 214 of zone 285. In this manner, by movement of cap 250 towards element 210, zone 285 would contact the cam prior to zone 287 contacting the cam. In this manner, zone 285 would be actuated independent of and prior to actuation of zone 287. Alternatively, the gripping regions of zone 285 and 287 can be structured differently to apply different levels of stress to the outer perimeter of the fiber(s) held therein, thus causing actuation to different portions of the fiber(s) at different times. In a further alternative, the actuating cap can be separated into two or more separate actuating caps which can be closed onto different portions of the splicing and gripping element at different times. In yet another alternative, the actuating cap can be designed to slide in a direction parallel to the fiber axis. In this manner, the actuating cap first engages a first clamping zone then, with further movement in a direction parallel to the fiber axis, actuates a second clamping zone.

Figure 6A:
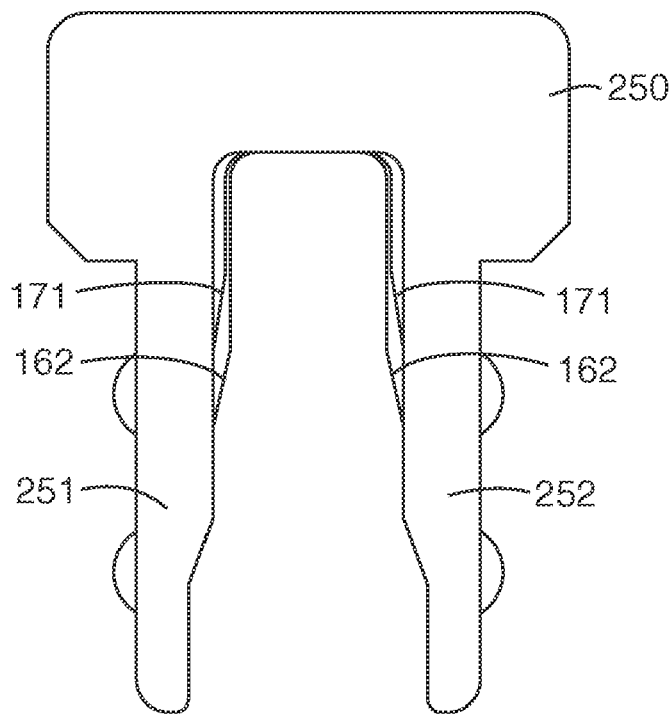
FIGS. 6A and 6B show end views of alternative actuating caps.
Figure 6B:
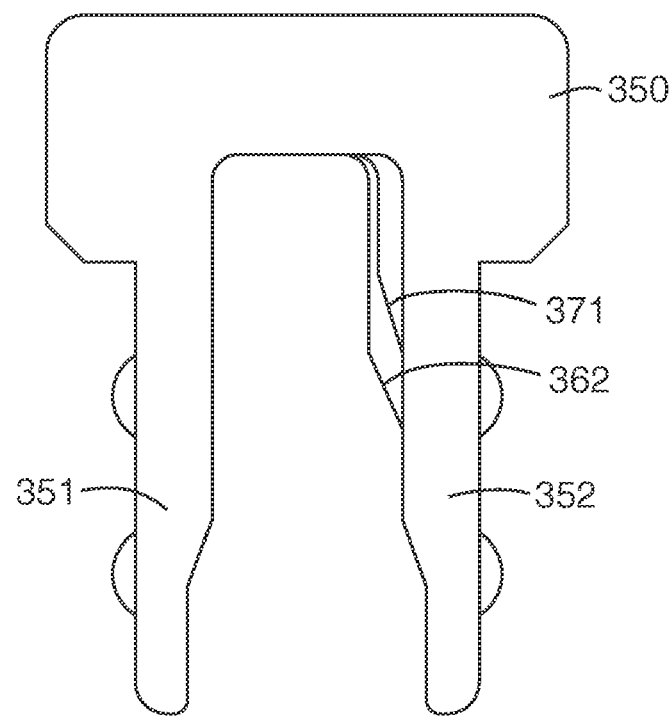

According to another exemplary embodiment, the actuating cap can be designed to provide either symmetrical or asymmetrical camming action. For example, FIG. 6A shows a symmetrical configuration, where cap 250 (similar to that shown previously) includes cams 162 and 171 on both of cap members 251 and 252. Alternatively, FIG. 6B shows cap 350, which includes cams 362 and 371 that are formed only on cap member 352. In another alternative (not shown), cam 362 can be formed on cap member 351 and cam 371 can be formed on cap member 352. Other alternative configurations would be apparent to one of ordinary skill in the art given the present description.

Figure 7:
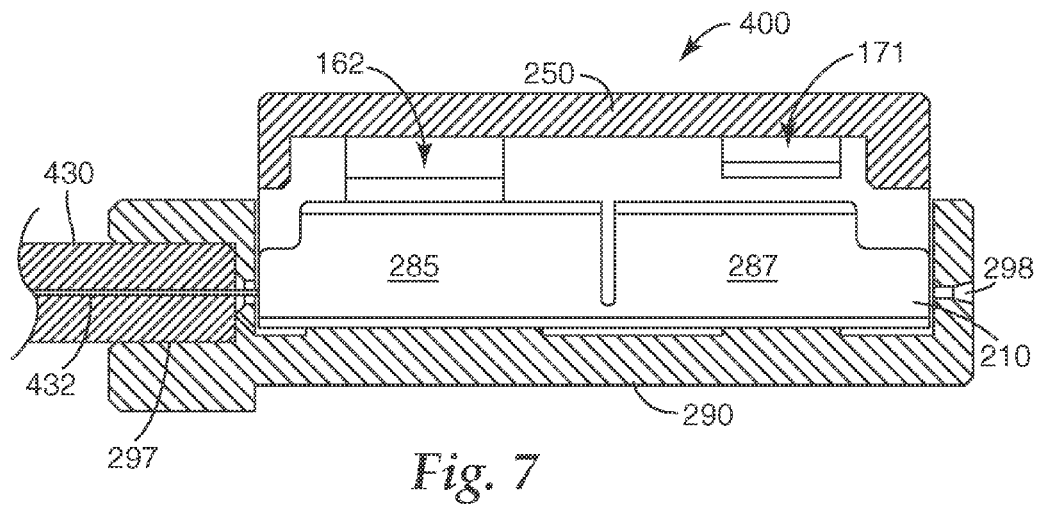
FIG. 7 shows a cross-sectional view of an exemplary fiber splicing and gripping device implemented in an optical connector device.

As mentioned above, element 110 can be implemented in many fiber optic splices and optical connectors. For example, an exemplary fiber connector 400 is shown in FIG. 7. In this configuration, element 210 is housed in connector base 290. As discussed above, a fiber stub, e.g., stub 430 having fiber 432, can be aligned within zone 285 prior to full actuation. Stub 430 can be inserted into port 297 of base 290. A terminating fiber end (not shown) can be inserted into the connector 400 through alignment port 298, through the open gripping region within zone 287 until butted up to fiber 432 within zone 285. Consistent with one or more exemplary embodiments above, actuation of the device can be accomplished by moving cap 250 towards element 210. In this exemplary configuration, cam 162 actuates zone 285 prior to cam 171 actuating zone 287. Alternatively, cap 250 can be designed so that cam 171 actuates zone 287 at the same time or prior to actuation of zone 285 by cam 162. As would be apparent to one of ordinary skill given the present description, device 400 can be designed to splice/grip other fibers, such as two terminating fibers.

In addition, as will be apparent to one of ordinary skill in the art given the present description, in alternative embodiments, variations of the splicing and gripping devices described herein can be utilized within 4×4 FIBRLOK™ and Multifiber FIBRLOK™ fiber optic devices (commercially available from 3M Company).

In a further alternative embodiment, element 110 can be located in a body for an optical fiber splicing and gripping device and can utilize one or more actuation caps that can individually close each section of the element. For example, a length of buffer coated optical fiber of a known diameter (e.g., a fiber optic pigtail) can include a cleaved and polished first end or a conventional optical connector (e.g., ST, LC, or FC type optical connector) attached at the first end. The other (second) end of the pigtail can be located inside of a buffer clamping section of the element 110. This second end of the fiber can have the buffer coating removed, and the stripped portion can extend part way into a splicing section of the same element. A first cap can actuate the buffer clamping section, resulting in the clamping of the element to the buffer coated fiber, while a second cap can be used later to actuate the fiber splicing part of the element when a terminating fiber is provided. As a result, element 110 can form a portion of a field-terminable fiber optic pigtail, which would allow for rapid installation in the field (e.g., where an installer would only prepare a second optical fiber (i.e., terminating fiber) for the splicing section to interconnect the fiber optic pigtail to that second fiber).

Figure 8:
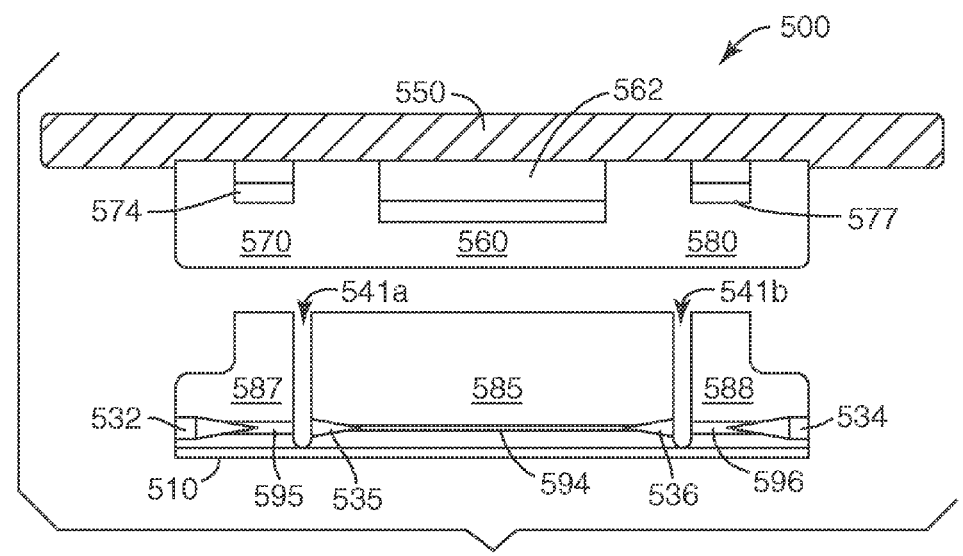
FIG. 8 shows a side view of a fiber splicing and gripping element and actuation cap according to an alternative embodiment of the present invention.

Another exemplary embodiment is illustrated in FIG. 8, which shows a fiber splicing and gripping device 500 that includes an element 510 and an actuating cap 550. In this exemplary embodiment, element 510 includes three separate clamping zones—splice zone 585, first buffer clamping zone 587 and second buffer clamping zone 588. Element 510 can optionally include one or more of recesses/ports 532, 534, 535, 536 to form lead-in fiber-receiving regions. In embodiments where slots 541A and 541B do not extend to the groove region of the element 510, lead-in fiber receiving regions 535 and 536 can be eliminated.

One or more of grooves 594, 595, and 596 can be formed in element 510 as v-grooves or grooves of other shapes, similar to those described above. In this exemplary embodiment, groove 594 is formed to have a first diameter (or groove size) when the device is actuated, and grooves 595 and 596 are grooved to form a second diameter (or groove size) when the device is actuated. The second diameter (or groove size) can be the same as or different than the first diameter (or groove size). In one exemplary embodiment, for example, when splicing silica-clad fibers, groove 594 can have a v-groove shape to grip a stripped fiber, and grooves 595, 596 can be shaped to grip the buffer portions of the fibers being spliced. Element 510 can be actuated by cap 550, which also can include three separate actuation mechanisms 560, 570, and 580. For example, as shown in FIG. 8, cap 550 can include three separate cams—cam 562 to actuate zone 585, cam 574 to actuate zone 587, and cam 577 to actuate zone 588. In an exemplary configuration, cap 550 can be designed so that cam 562 actuates zone 585 at the same time or prior to actuation of zone 587 and 588 by cams 574 and 577, respectively. As would be apparent to one of ordinary skill given the present description, device 500 can be designed to splice/grip any type of fiber.

As described above, the splicing and gripping device of the present invention can be configured to include multiple gripping/splicing zones so that a different level of stress can be imparted on the fiber that is located in a particular zone and at a particular place in the splicing sequence.

As fiber optics are deployed deeper into the metro and access areas of a network, the benefits of such mechanical interconnection products can be utilized for Fiber-To-The—Home/Desk/Building/Business (FTTX) applications. The devices of the present invention can be utilized in installation environments that require ease of use when handling multiple splices and connections, especially where labor costs are more expensive.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. An optical fiber splicing and gripping device, comprising: a splice element having first and second members hingedly attached; a gripping region formed in said splice element that includes first and second gripping portions disposed on first and second inner portions of each of said members, wherein at least one slot is disposed between first and second clamping zones formed along a length of said gripping region; and a cap engageable with said splice element to selectively actuate the first clamping zone independently of actuating the second clamping zone, wherein the cap includes a first cam and second cam, wherein the first cam imparts a first amount of stress to a fiber inserted in said gripping region in the first clamping zone, and the second cam imparts a second amount of stress to the fiber inserted in said gripping region in the second clamping zone, said first amount different from said second amount.

2. The optical fiber splicing and gripping device according to claim 1, wherein the splice element includes a first slot located on the first member and a second slot located on the second member, opposite the first slot.

3. The optical fiber splicing and gripping device according to claim 1, wherein the at least one slot extends into at least one of the first and second gripping portions.

4. The optical fiber splicing and gripping device according to claim 1, wherein the folded splice element includes a region of thinner material disposed between the first and second clamping zones.

5. The optical fiber splicing and gripping device according to claim 1, wherein said first cam is adapted to engage said first clamping zone prior to said second cam engaging said second clamping zone.

6. The optical fiber splicing and gripping device according to claim 1, wherein at least one of the first and second gripping portions comprises a v-groove.

7. The optical fiber splicing and gripping device according to claim 1, wherein the cap includes a main body portion that extends along a length of the cap and couples a first cap member and second cap member extending therefrom.

8. The optical fiber splicing and gripping device according to claim 7, wherein said first cam is disposed on an inner surface of at least one of said first and second cap members.

9. The optical fiber splicing and gripping device according to claim 7, wherein said second cam is disposed on an inner surface of at least one of said first and second cap members.

10. The optical fiber splicing and gripping device according to claim 8, wherein said first cam includes a first transition portion sloping outwardly in a gradual manner from said inner surface.

11. The optical fiber splicing and gripping device according to claim 10, wherein said second cam includes a second transition portion sloping outwardly in a gradual manner from said inner surface, wherein said second transition portion is disposed closer to said main body portion than said first transition portion.

12. The optical fiber splicing and gripping device according to claim 7, wherein the cap further comprises at least one detent formed on an outer surface of at least one of the first and second cap members, said at least one detent adapted to engage with a housing for the fiber splicing and gripping device.

13. The optical fiber splicing and gripping device according to claim 1, wherein the splice element comprises at least two slots to define separate first, second, and third clamping zones along a length of said gripping region, and wherein the cap includes a first cam, a second cam, and a third cam, wherein said first cam is adapted to engage said first clamping zone independently of said second cam engaging said second clamping zone and said third cam engaging said third clamping zone.

14. The optical fiber splicing and gripping device according to claim 1, wherein the first member has a length different from a length of the second member.

15. The optical fiber splicing and gripping device according to claim 1, wherein the first and second gripping portions of the first clamping zone include a first groove and the first and second gripping portions of the second clamping zone include a second groove, wherein the second groove has a different groove size than a groove size of the first groove.

16. An optical connector, comprising: a base; and an optical fiber splicing and gripping device disposed in said base, the optical fiber splicing and gripping device including a splice element having first and second members hingedly attached; a gripping region formed in said splice element that includes first and second gripping portions disposed on first and second inner portions of each of said members, wherein at least one slot is disposed between first and second clamping zones formed along a length of said gripping region; and
a cap engageable with said splice element to selectively actuate the first clamping zone independently of actuating the second clamping zone, wherein the cap includes a first cam and second cam, wherein the first cam imparts a first amount of stress to a fiber inserted in said gripping region in the first clamping zone, and the second cam imparts a second amount of stress to the fiber inserted in said gripping region in the second clamping zone, said first amount different from said second amount.

17. The optical connector according to claim 16, wherein the splice element includes a second slot located on the second member, opposite the first slot.

18. The optical connector according to claim 16, wherein the splice element includes a region of thinner material disposed between the first and second clamping zones.

19. The optical connector according to claim 16, wherein said first cam is adapted to engage said first clamping zone prior to said second cam engaging said second clamping zone.

20. The optical connector according to claim 16, further comprising a fiber optic pigtail, wherein a first portion of the fiber optic pigtail is gripped by the first clamping zone.

* * * * *